United States Patent [19]

Klopping

[11] 3,896,230

[45] *July 22, 1975

[54] FUNGICIDAL FORMULATIONS OF 2-BENZIMIDAZOLE-CARBAMIC ACID, ALKYL ESTERS

[75] Inventor: Hein L. Klopping, Wilmington, Del.

[73] Assignee: E. I. du Pont de Nemours & Co., Wilmington, Del.

[ * ] Notice: The portion of the term of this patent subsequent to Apr. 18, 1989, has been disclaimed.

[22] Filed: Feb. 1, 1974

[21] Appl. No.: 438,943

Related U.S. Application Data

[63] Continuation of Ser. No. 182,541, Sept. 21, 1971, abandoned, which is a continuation-in-part of Ser. No. 862,081, Sept. 29, 1969, Pat. No. 3,657,443, which is a continuation-in-part of Ser. No. 727,036, May 6, 1968, abandoned, which is a continuation-in-part of Ser. No. 629,914, April 11, 1967, abandoned.

[52] U.S. Cl. .......... 424/273; 424/DIG. 8

[51] Int. Cl. .......... A01n 9/22

[58] Field of Search .......... 424/273, DIG. 8

[56] References Cited

UNITED STATES PATENTS

| | | | |
|---|---|---|---|
| 2,933,502 | 4/1960 | Klopping | 424/273 |
| 3,657,443 | 4/1972 | Klopping | 424/273 |

*Primary Examiner*—V. D. Turner

[57] ABSTRACT

Compounds of the formula:

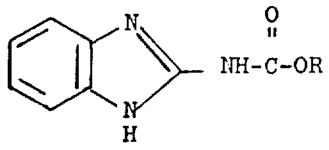

where R is methyl or ethyl, particularly when in the form of particles below 5 microns in diameter, are useful as fungicides to control fungus diseases of living plants when formulated or mixed with nonphytotoxic spray oils.

8 Claims, No Drawings

FUNGICIDAL FORMULATIONS OF 2-BENZIMIDAZOLE-CARBAMIC ACID, ALKYL ESTERS

CROSS REFERENCE TO RELATED APPLICATIONS

This application is a continuation of my copending application Ser. No. 182,541, filed Sept. 21, 1971, now abandoned, which is a continuation-in-part of my copending application Ser. No. 862,081, filed Sept. 29, 1969 now U.S. Pat. No. 3,657,443, which application is a continuation-in-part of my copending application Ser. No. 727,036, filed May 6, 1968, now abandoned which application is a continuation-in-part of my then copending application Ser. No. 629,914, filed Apr. 11, 1967, now abandoned.

BRIEF SUMMARY OF THE INVENTION

This invention relates to fungicidal compositions useful for the beneficial control of fungus diseases of living plants or plant parts. These compositions provide a systemic and curative effect while at the same time providing a protective effect with a broad margin of safety to the plants. The matter of safety to plants, obviously, is of the utmost importance.

I have discovered that the aforementioned beneficial effect is provided by compositions comprising a compound of the formula:

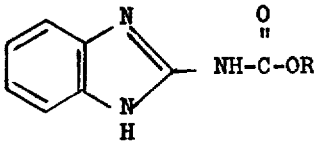

where R is methyl or ethyl, particularly when the compound is in a very finely divided form of particles below 5 microns in diameter with 10 to 50,000 parts per 100 parts of said compound of a nonphytotoxic spray oil.

It will be understood that the above structure can exist in two tautomeric forms:

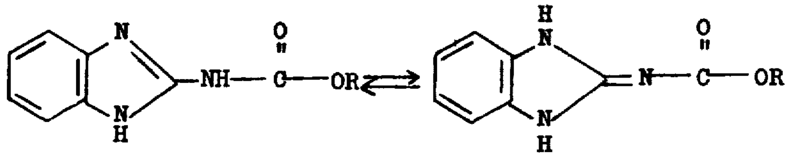

The salient attributes of this invention are that the compositions taught (1) eminently meet the numerous demanding requirements (including lack of phytotoxicity) of practical fungus disease control of desirable plants and (2) provide the highly unique result of curing plants that are already infected with virulent fungi. These attributes are obtained by applying the active ingredient in the compositions of the invention, such compositions containing adjuvants which facilitate the penetration of the active ingredient into plants and as a result provide a systemic action.

In order to be of utility in the control of fungus diseases of living plants, it is necessary that compositions provide, first and foremost, for an adequate margin of safety to the treated plants. A great many of the compounds which show fungicidal effects when tested in artificial media or on other inanimate substrata cannot be used to control fungus diseases of living plants due to an undesirable effect on the host plants. Further some compounds which are active in vitro are inactive in vivo.

The compositions of this invention are remarkable in the broad range that exists between the minimum use levels required for the desired disease control performance and amounts that can be applied without plant injury (phytotoxicity). In many instances, levels 60 or more times the required minimum use rate are safe on the host plants.

Phytotoxicity may take any of a number of forms among which are: leaf burn, reduced or abnormal top growth, abnormal root growth, reduced fruit set, poor fruit finish, decreased yield and undesirable harvest quality (reduced sugar or protein, disagreeable taste, etc.). The compositions of this invention are free of any implication in adverse effects of these or other types.

It has been demonstrated that in many instances heavy metal ions play a part in certain types of phytotoxicity. It has been reported, for example, that trace amounts of copper can damage apple finish. Such heavy metals can also accumulate to undesirable levels in soils. The compositions of this invention make it possible to avoid completely the use of phytotoxic heavy metal ions in treatments for fungus disease control.

Additional requirements for practical fungus disease control on plants include use of available or easily obtainable application equipment, convenience and safety in handling, lack of hazard to the consumer of treated agricultural produce, and others well known to those skilled in the art. The compositions of this invention also satisfy these requisites admirably.

An exceptionally valuable characteristic of the compositions of this invention is their effectiveness in curing fungus infections already present in living plants. Plant diseases are now most commonly controlled by protective sprays applied on a predetermined schedule. Although this requires that the expenditure be made before it is known whether or not disease would actually appear, no other course of action is open to the grower due to the lack of reliable and broadly active curative treatments.

Employing the curative compositions of this invention, no chemical need be applied until after weather conditions or other circumstances have been such as to actually permit the initiation of fungus attack (infection). The compositions of this invention make it possible to eliminate the fungus (or fungi) from within the plant (i.e., to cure the disease). The great savings to the grower in chemical cost and application labor as a result of the curative effect of the compositions of this invention are clearly apparent. When conditions favoring disease fail to appear during the life of a crop, as is sometimes the case, the cost of chemical treatment is entirely eliminated through the knowledge that curative treatments are available if needed.

The active components of the compositions of the invention can enter and move about within living plants. Such entry and systemic movement is a factor in the curative effect described above. In addition, however, this entry and systemic movement result in effective and extended protection of the treated plants for subsequent new fungus attack. A fungus germinating on the plant surface, penetrating the epidermis and growing into or around the host plant cells comes into contact with the fungicide inside the host and is killed. Thus, treatments made to cure an existing fungus infection also serve the dual purpose of providing protection for the future and the compositions of this invention can be employed to provide preventive control of fungus diseases.

Curative and preventive disease control on desirable living plants are obtained to the greatest extent when the compounds of the formula are finely divided (as described hereinafter) and used in conjunction with the oils defined below.

The matter of particle size deserves special attention. Although the initial effect obtained with a particular chemical is often improved as particle size is reduced, the residual effect frequently decreases. The latter phenomenon is associated with characteristics permitting or enhancing excessive chemical loss from small particles. The compounds of the formula are improved in performance, especially curative disease control and consistency in activity, as the particle size is decreased to the degree specified. The small particle size material, when used as described, results in the maximum penetration required for most effective systemic activity and curative disease control yet provides full residual disease protection and also an adequate margin of safety to the treated plants.

DETAILED DESCRIPTION OF THE INVENTION

The 2-benzimidazolecarbamic acid esters of the formula can be prepared by any of several methods. For example, the esters can be prepared by the three reaction sequence of U.S. Pat. No. 3,010,968 in which, in the first reaction, thiourea is mixed with dimethyl sulfate to produce 2-methylthiopseudoureasulfate in solution. The second reaction consists of the addition to the reaction mixture of an alkyl chloroformate followed by a base to produce an acylated 2-methylthiopseudourea. The last step consists of the addition of a protonic acid and an o-phenylenediamine to produce the desired benzimidazoles.

As previously mentioned, these esters provide systemic, curative and preventive control of a wide variety of fungus disease of desirable plants without damaging the host. The many fungi against which these compounds are active may be represented by, without being limited to, the following: *Venturia inaequalis*, which incites apple scab; *Podosphaera leucotricha*, which incites powdery mildew on apple, *Uromyces phaseoli*, which incites bean rust; *Cercospora apii*, which incites early blight of celery; *Cercospora arachidicola* and *C. personate*, which incite leaf spot of peanuts; *Cercospora beticola*, which incites leaf spot of sugar beets; *Cercospora musae*, which incites Sigatoka disease of banana; *Septoria apii-graveolentis* which incites late blight of celery; *Monolinia (Sclerotinia) laxa* or *M. fructicola* which incites brown rot of stone fruits; *Guignardia bidwelii* which incites grape rot; *Botrytis cinerea*, which incites gray mold on fruits and vegetables; *Erysiphe cichoracearum*, which incites powdery mildew on cantaloupe and other cucurbit crops; *Penicillium digitatum*, which incites green mold on citrus; *Penicillium expansum*, which incites blue mold on apples; *Sphaerotheca humuli*, which incites powder mildew on roses; *Diplocarpon rosae*, which incites black spot on roses; *Pithomyces chartorum* which is found in pastures and other turf areas; *Uncinula necator*, which incites powdery mildew on grapes; *Coccomyces hiemalis*, which incites cherry leaf spot; *Cladosporium carpophilum*, which incites peach scab; *Erysiphe graminis hordei*, which incites powdery mildew on barley; *Piricularia oryzae*, which incites rice blast; *Mycosphaerella citrullina* which incites gummy stem blight of cucurbits; *Colletotrichum* spp., which incite anthracnose disease on a number of crops and *Sclerotinia sclerotiorum*, which incites mold or rot of beans and other crops.

The compositions of this invention provide a systemic, curative and protective effect against fungus diseases of living plants when applied to the proper locus by the methods described hereinafter and at a sufficient rate to exert the desired effect. They are especially suited for disease control on living plants such as fruit-bearing trees, nut-bearing trees, ornamental trees, forest trees, vegetable crops, horticultural crops (including ornamentals, grapes, small fruits and berries), fiber crops, grain and seed crops, sugarcane, sugar beets, pineapple, forage and hay crops, beans, peas, soybeans, peanuts, potatoes, sweet potatoes, tobacco, hops, turf and pasture.

Living plants may be cured of fungus diseases or protected from fungus attack by applying one or both of the active compounds to the plant by foliar treatment. Applications to plants to accomplish the initial curative effect as well as to provide subsequent protection from fungus diseases are made to the aerial parts (i.e., stems, foliage or fruit) by spraying or misting as described in more detail below.

Preferred rates for application of the active compounds to foliage, stems and fruit of living plants range from 0.02 to 20 kg of the active ingredient per hectare. The optimum amount within this range depends upon a number of variables which are well-known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days.

Application to the foliage, stems and fruit of plants at the rate indicated above is generally accomplished by employing sprays or aerosols containing the proper amount of active ingredient. For the control of fungus diseases which are regularly present, applications may start prior to the time that the problem actually appears and continue on a pre-determined schedule. Such a procedure is termed "preventive" or "protective" disease control.

With the compositions of this invention, successful control is also accomplished by applications made after the plants are already diseased. Fungus mycelia within the plant tissue are actually killed. This approach or effect is termed "curative" or "eradicant" and permits the user to realize the considerable savings discussed above.

Curative as well as preventive control of plant diseases with the compositions of this invention is enhanced if the treated plant parts are moist for one or more periods of 2 to 12 hours each soon after the composition containing the active compound is applied. Often the slow drying of an original spray treatment or naturally occurring rains, mists, fogs or dews will accomplish this. Under other circumstances, such as during dry periods or in shelters such as greenhouses, it may be necessary to keep the plants moist by some special effort to assure best results.

The compositions of the invention contain in sufficient amount to exert disease control action, one or both of the above-described fungicide compounds in admixture with a carrier material as well as one or more conditioning agents of the kind often used. These materials are commonly referred to in the art as foliar fungicide adjuvants or modifiers. The general classes of foliar fungicide adjuvants applicable to the compounds of this invention are inert solids, organic liquids or aqueous diluents, and small amounts of surface-active agents to obtain wetting, dispersion or emulsification. Compositions adapted for ready and efficient application using conventional applicator equipment are prepared by formulating compounds of this invention with suitable adjuvants by mixing, grinding, stirring or other conventional processes. Normally, the active ingredient comprises 1–98% by weight of fungicidal composition.

Solid compositions may be in the form of dispersible powders which are particularly useful and can be prepared by simple mixing and grinding steps and can be used either as such or suspended in a suitable liquid medium for spray application. The powders usually comprise the active ingredient admixed with varying amounts of conditioning agents, including ingredients such as corrosion inhibitors, pigments, stickers, etc. The classes of extenders suitable for the wettable powders of this invention are clays such as the kaolins, diatomaceous earths, and also synthetic silicas and silicates. Diluents of organic origin such as walnut shell flours, lignosulfonates, starches, dextrines, sugars, etc. can also be used.

In compositions such as wettable powders, suspensions and slurries it is desired to have the active compounds present in the proper amount for optimum fungicidal activity and in a fine particle size. The desired fine particle size can be obtained, for example, by fine grinding. Preferred grinders to obtain such fine particles include ball and pebble mills, sand mills, air mills, pin or stud mills, "Attritors," whizzer mills, ring-roller mills, disk mills and the like. Regardless of the type of grinder used, the grinding process must be carried out under conditions to assure that the product which is made shall have an adequately fine particle size. Particle size classifiers can be used in conjunction with the grinders to help meet this requirement. The use of sucrose as a grinding aid also helps obtain the desired particle size.

These very finely divided forms of the active ingredient are preferred over formulations of conventional particle size. The finely divided form has improved penetration into the plants and, thus, enhances the curative effect. These fine particles also have improved solubility characteristics. Furher, these forms are stable and have good residual activity, thus providing preventive control. With many fungicides, a reduction in particle size can lead to problems of both instability and phytotoxicity; this is not the case with the finely divided forms of this invention.

By very finely divided form it is meant that the particle size is predominantly less than 5 microns in diameter, with at least 40% by weight of the active compound and preferably 60% by weight, in the form of particles below 2 microns in diameter. The particle size refers to the ultimate particle size as it exists in the spray droplet or dust which contacts the plant. In the dry compositions, or even in the spray slurry before spraying, the fine particles can exist as floccules or aggregates, or agglomerates, in which several fine particles are associated together.

The preferred method to determine the particle size of the active compounds is by sedimentation analysis in an Andreasen pipette. In this method, the decrease of concentration is determined of particles at a particular level in a suspension, as they settle according to Stokes' Law under the influence of gravity. This is a well-known technique for particle size analysis, and numerous references can be cited to describe in general how particle size and particle size distributions can be determined by this method:

Orr and Dalla Valle "Fine Particle Measurement," MacMillan Co., New York 1959, Chapter 3

Irani and Callis, "Particle Size:Measurement, Interpretation, and Application," John Wiley & Sons, New York, 1963, Chapter 5.

Herdan "Small Particle Statistics," 2nd Edition, Academic Press, New York, 1960, Chapter 20

Lauer "Grain Size Measurements on Commercial Powders," Alpine AG, Augsburg, Germany, English Edition, 1966.

For the compounds of the compositions of the invention, a sample of formulated commodity, or if the technical material is used, a sample of the technical active ingredient plus suitable wetting and dispersing agents, is dispersed to form a slurry of up to 1% concentration in sufficient volume to fill the Andreasen pipette. This is preferably done by gently pasting the material in about 10% of the final volume using distilled water and then stirring for about 15 minutes to disperse the product. The concentrate is then diluted with additional distilled water to the appropriate volume for the pipette. Before the start of the actual sedimentation analysis the pipette is shaken vigorously for about 1 minute and then inverted vigorously 10 to 20 times to obtain a homogeneous slurry.

Immediately before the start of the settling period a sample is taken to represent the initial, uniform slurry. Sedimentation is then carried out by allowing the pipette to stand undisturbed, free from vibrations, at constant temperature, so that the particles can settle in accordance with the terminal velocity governed by their size and the balance between gravity forces and drag forces in the sedimentation fluid. Samples are withdrawn from the Andreasen pipette at suitable time intervals corresponding to the particle sizes of interest. The amount of active ingredient in each sample represents material which has not yet settled below the sampling point, and which therefore has a particle size smaller than those particles which would have settled below the sampling point in the indicated time period.

From the analysis of the active ingredient content of the samples and the settling times, the sedimentation diameters, or a particle size distribution curve can be calculated by the use of Stokes' Law. In the calculation of Stokes diameters, some assumptions must be made regarding the particle shape, and the particle sizes referred to for the active compounds are the equivalent spheres, e.g., the particle diameter is defined as the diameter of a spherical particle that would settle at the same rate as the particle concerned. These sizes are found by using the equation:

$$d = 175 \quad \frac{n}{\rho 1 - \rho 2} \cdot \frac{h}{t}$$

where $d$ = diameter of particle in microns
$n$ = viscosity in g/cm/sec
$\rho$ 1 = specific gravity of solid in g/cm$^3$
$\rho 2$ = specific gravity of liquid in g/cm$^3$
$h$ = settling distance in cm
$t$ = settling time in minutes.

One critical aspect of pipette sedimentation analysis is the requirement that the particles of the active compounds are dispersed in the sedimentation fluid and not agglomerated or flocculated so that the particles can settle as individuals rather than as aggregates. If the degree of dispersion is poor, e.g., if particles settle as aggregates, inaccurate results are obtained, and the particle size distribution appears to be coarser than it really is. There are a number of methods to ascertain that a good dispersion, suitable for sedimentation analysis, is obtained. One such method is microscopic examination of drops of the dilute suspension in transmitted light at a suitable magnification. A poorly dispersed sample will show characteristic flocculation structures, whereas a well-dispersed one will show individual particles evenly spaced, with particles smaller than approximately 2 microns exhibiting Brownian movement. Since the agitation inherent in placing drops on a microscope slide and applying a cover glass may redisperse agglomerated material, examination of such slides should be made not only immediately upon preparation, but also a few minutes later to determine whether flocculation exists. Another method of checking for adequate dispersion is to take samples representing a given cut size at different sample heights in the pipette, e.g., after different settling times. This can be accomplished, for example, by using different volumes of settling fluid in the Andreasen pipette. Since flucculation is a phenomenon which often takes place slowly with time, a significant discrepancy between the results for a given cut size obtained in this manner would indicate inadequate dispersion, particularly if the percentage of active ingredient remaining in the sample is less in the sample which has been allowed to settle through the greater distance for the longer time period.

If the formulations of the 2-benzimidazolecarbamic acid esters contain clays and other water-insoluble ingredients, the samples taken during Andreasen sedimentation analysis are analyzed optically for the amount of active ingredient. A 1 ml aliquot of the sample is shaken with about 70–80 ml of 0.1 N NaOH, and diluted to 100 ml. A 10 ml portion of this suspension is clarified by suitable filtration (such as in a Swinny filter attached to a syringe) and the UV absorbance of the clarified solution or an aliquot of the same is determined on a spectrophotometer at 292 m$\mu$. The amount of 2-benzimidazolecarbamic acid ester is then obtained by comparison to a calibration curve obtained in a similar manner from known amounts of active ingredient. Where the other, water-soluble ingredients, such as the surface-active agents, also have UV absorbance at the 292 m$\mu$ wavelength, suitable corrections must be made.

When the material which is evaluated by pipette sedimentation consists of technical compound of the compositions of the invention, possibly in the presence of wetting and dispersing agents to get adequate dispersion in the sedimentation fluid, or where the formulation ingredients other than the active compounds are soluble in the sedimentation fluid, the amount of active ingredient in the different pipette samples taken after different time periods can be determined by simple gravimetric analysis of the total solids present, making due allowances for the constant amount of dissolved solids in all samples.

Another method sometimes useful for particle size analysis for the active compounds of the compositions of the invention is microscopic counting. This method, however, is applicable only in cases where the active ingredients are the only solids visible in the microscope. In most formulations the inerts and the other additives will also show up as particles in the microscope, and it is usually difficult to differentiate between particles of fungicidal compound versus the additives. Where, however, a particle size of the pure active compound is to be determined, or where the formulation additives can be dissolved away or are soluble in the medium which is placed on the microscope slide with the active ingredient, or where the formulation is a suspension concentrate in which the active compound is the sole or predominant solid phase, microscope methods can often be used. There are numerous general references to microscopic analysis such as:

Orr and Dalla Valle "Fine Particle Measurement," MacMillan Co., New York 1959, Chapter 2

Irani and Callis "Particle Size:Measurement, Interpretation, and Application," John Wiley & Sons, New York, 1963, Chapter 6

Herdan "Small Particle Statistics," 2nd Edition, Academic Press, New York, 1960, Chapter 18

Lauer "Grain Size Measurements on Commercial Powders," Alpine AG, Augsburg, Germany, English edition, 1966, Chapter 4.

A method to determine the particle size of the active compounds is to take photomicrographs, for example at 800X magnification, and then compare the individual particles on the pictures against a thin transparent template which has round holes corresponding to 1, 2, 3, etc. microns at that magnification. Particle images matching in area a given hole size can be counted, and duplicate counts can be avoided by piercing the photomicrograph with a needle whenever a particle has been counted. By counting at least approximately 700–1,000 particles in this manner, a particle size distribution can be calculated.

When particle size distributions are calculated from microscopic counts, an assumption must be made concerning the third dimension (height or thickness) which of course does not appear in the microscope. Comparisons of Andreasen pipette sedimentation results as described above with microscopic counts have shown that good results are obtained from microscopic particle size analysis when it is assumed that all of the particles have the same thickness, e.g., that the larger particles are platelets. With this assumption, the weight fractions are calculated from the square of the particle diameters measured by inspection with the plastic template. However, where it is known that the large particles are approximately cubical or spherical it will be more accurate to calculate the particle size distribution from the cubes of the particle diameters.

In microscopic particle size analysis great care must be taken that the sample which is to be examined on the microscope slide is representative of the product whose particle size is to be determined, and that the photomicrographs from which the actual counts are made are representative of the slides being evaluated. As will be appreciated by those skilled in the art, it is usually necessary to prepare several microscope slides, in each case taking separate samples from the product or the slurry of the product, and then for each slide to inspect a number of fields in order to obtain a representative view to count.

Liquid compositions employing one or more of the active disease control compounds of this invention are prepared by admixing the active ingredient with a suitable liquid diluent medium. The active ingredient can be either in solution or in suspension or both in the liquid medium. Typical of the liquid media which may be used are water, paraffinic and naphthenic spray oils, and naturally occurring oils such as triglycerides and pine oil. The active ingredient usually makes up from about 0.5 to 50% of these liquid compositions. In addition, emulsifiers may be present to aid in the suspension or dispersion or to emulsify the composition into water, and stickers can be present to improve adhesion to foliage.

Compositions of the invention, especially liquids and wettable powders, contain wetting agents, dispersing agents, suspending agents and emulsifying agents in amounts sufficient to render a given composition readily dispersible in water or in oil. Suitable such surface-active agents include anionic, cationic, non-ionic and amphoteric types although many cationic species are phytotoxic and therefore not preferred. In general, less than 10% by weight of the surface-active agent is present in the compositions of this invention, although frequently the amount of surface active agent in these compositions is less than 2% by weight.

Fungus disease control on living plants, particularly curative, with the compounds of the formula is markedly improved by using certain adjuvants, for example, in the water in which the benzimidazole fungicide is applied. These adjuvants can be an integral part of the formulation or can be added separately from the active compounds. These adjuvants are certain non-phytotoxic oils as described below. They markedly improve the systemic disease control performance of the active compounds on foliage, stems and fruit. This adjuvant effect is most marked, but not so limited, in situations in which the fungi have already entered the plant and, therefore, a curative effect is required.

With the use of these oils the particle size of the active ingredient is not as critical, although the best results still are obtained when the finely divided active ingredient is used.

The oils which act to improve systemic activity include paraffinic and naphthenic hydrocarbon spray oils, naturally occurring oils such as pine oil, the triglycerides and their derivatives, e.g., derived mono or diglycerides as well as hydrocarbon polymers with a softening point of 25°C or below and a molecular weight lees than 10,000. The above oils can be employed with or without surface-active agents at 0.5–10% based on composition weight. With surfactant present, the oils or oils plus dispersion of active can be dispersed in water and the active and oil applied via an aqueous carrier. Without surfactant, the oil and active can be applied directly as a low volume or ultra low volume dispersion.

Paraffinic spray oils consist of petroleum fractions which are primarily mixtures of saturated, mostly branched-chain, hydrocarbons. Naphthenic spray oils are petroleum fractions which contain saturated cyclic hydrocarbon structures having various amounts of branching. These oils can be characterized as follows: Unsulfonatable residue — 75–100%, preferably 88–100%. Viscosity in Saybolt seconds at 100°F of 40–220, preferably 50–120. Distillation at 10 mm Hg. 50% Point — 300°–600°F, preferably 400°–500°F. Examples of typical petroleum derived spray oils together with their properties are listed in Table I.

TABLE I

Petroleum Derived Spray Oils

| Oil | Unsulfonatable % Residue[1] | Dist. at 10 mm Hg°F 50%[2] | Viscosity at 100°F. Saybolt sec. |
|---|---|---|---|
| Amoco Spray Oil | 98 | 449 | 85 |
| Humble "Orchex" 696 | 96 | 415 | 60 |
| Humble "Orchex" 796 | 96 | 435 | 73 |
| Shell Spray Oil | 94 | 400 | 69 |
| Volck Supreme, Standard Oil (Cal.) | 94 | 490 | 147 |
| Standard Oil (Ohio) Spray Oil | 90 | 455 | 75 |
| Sun No. 7N | 94 | 420 | 72 |
| Sun No. 7E | 94 | 420 | 72 |
| Sun No. 11N | 94 | 718[3] | |
| Sun No. 16N | 90 min. | 780[3] | 150–160 |

[1]ASTM Method D-483
[2]ASTM Method D-1160
[3]ASTM Method D-447 (atmospheric pressure)

The naturally occurring triglyceride oils are esters of glycerol and fatty acids, the structures of which have been well elucidated. The chief acids from which the oils are derived are caproic, caprylic, capric, lauric, myristic, palmitic, stearic, oleic, erucic, linoleic, linolenic and eleostearic. The triglycerides thus consist of glycerol esterified with acids such as the above either singly or in combination. Traces of other saturated or unsaturated acids may also be present.

Examples of the triglyceride oils are cottonseed, peanut, corn, soybean, castor, coconut, olive, rapeseed, palm, linseed, fish, sunflowerseed, tung and sesame. Triglycerides which are normally classed as fats are also useful in the composition of the invention, if they are diluted with a solvent or liquid triglyceride.

Mono and diglycerides which are either hydrolysis products or natural oils and fats or which can be prepared by reaction of the above fatty acids with glycerol are also operable either alone or when diluted with a solvent.

The above described oils can be made emulsifiable into water by blending them with surfactants such as alkylaryl polyethoxy alcohols; condensation products of ethylene oxide with long-chain alkyl alcohols, mercaptans or amines; polyhydric alcohol esters such as sorbitan fatty acid esters, polyoxyethylene sorbitol or sorbitan fatty acid esters; polyethylene glycol fatty esters, fatty alkylol amide condensates; amine salts of fatty alcohol sulfates and oil soluble salts of petroleum sulfonates. Other suitable emulsifying agents are listed in "Detergents and Emulsifiers" 1970 Annual by J. W. McCutcheon. Preferred are the polyoxyethylene sorbitol oleates (Atlas G-1086 and "Atlox" 1087), polyhydric alcohol esters ("Trem" 014), polyoxyethylene oleyl ether and octylphenoxypolyethoxyethanol ("Triton" X-114).

The hydrocarbon polymers operable in this invention consist of products derived from unsaturated aliphatic, alicyclic or aromatic monomers, and having a softening point of 25°C or below and having a molecular weight below 10,000. The aliphatic and alicyclic structures are preferred. Examples are the polyterpene resin such as "Piccolyte" S-10 and those of some aromatic content such as "Transphalt" L-4. With the resins, it is frequently desirable to include a hydrocarbon solvent and a surfactant such as those listed above, to reduce viscosity and aid emulsification into water. In many instances, it will be beneficial to combine the oils with larger amounts of surfactants than the 0.5 to 10% required to emulsify the oils. For example, it is often desirable to use up to 5 parts surfactant to one part of oil.

The compositions containing the active ingredient and the oils useful to enhance the disease control activity can be made in several ways. For example, the oil can be mixed with the active ingredient or the active ingredient formulated in a conventional composition at the time when spray slurries are being prepared. It is often also possible and convenient to produce formulations in which the oil and the active ingredient will both be present in a composition which is convenient to apply, for example by dispersion in water followed by spraying. Such compositions can be powders, suspensions, or even solutions, depending upon the physical and chemical characteristics of the components that are to be prepared. In suspension formulations the oil may replace a portion or even all of the liquid carrier, and it is often convenient to apply such compositions without dilution by ULV application techniques.

It is often convenient and beneficial to provide the oils as a separate composition, for example as a water dispersible liquid or as a mixture with diluents such as clay or fine silica. This procedure provides for convenient addition to a spray slurry and enhances the biological activity of the application.

It will be readily understood by those skilled in the art and in the light of the above teachings that the ratios of active ingredient compound to oil can vary widely. Thus, the oil can be present in such mixtures within the range of from 10 to 50,000 parts per 100 parts of active ingredient. More preferred are rates of from 50 to 10,000 parts per 100 parts of active ingredient and a range of ratios from 100 to 2,000 per 100 parts of active ingredient is even more preferred. The lower ratios are useful when higher concentrations of the active compound are applied, while the higher ratios are most useful when lower concentrations of the active compound are applied.

In order that the invention may be better understood, the following examples are offered:

EXAMPLE 1

The compound 2-benzimidazolecarbamic acid, methyl ester is prepared by the following method.

A mixture of 228 parts of thiourea and 110 parts of water is treated over a five minute period with 244 parts of dimethyl sulfate. Rapid agitation is used throughout the whole procedure. The temperature of the reaction mixture rises to 95°C, then begins to subside. The material is brought to reflux by application of heat and held at reflux for 30 minutes, and then cooled to −3°C, diluted with 1800 parts of water, and treated with 535 parts of methyl chloroformate in one portion. A 25% solution of aqueous sodium hydroxide is added at such a rate as to keep the pH of the reaction mixture between 6 and 7 and the temperature below 25°C. When the pH of the mixture reaches 6.9 and the rate of change of pH has become negligible, the addition of base is stopped. The amount of base required is 1,085 parts by volume of 25% solution. The temperature at the end of this addition is 23° C. Immediately after completion of the base addition, 360 parts of glacial acetic acid is added over a 20 minute period, followed by 324 parts of o-phenylenediamine on one portion. The resulting mixture is slowly warmed to 80°C and held there for 30 minutes, then cooled to 27°C and the light tan solid product isolated by filtration, washed well with water and acetone, and air-dried.

2-Benzimidazolecarbamic acid, ethyl ester is similarly made using ethyl chloroformate in place of the methyl chloroformate of the above example.

EXAMPLE 2

| | Percent |
|---|---|
| 2-benzimidazolecarbamic acid, methyl ester | 26.0 |
| ("Piccolyte" S-10), a thermoplastic polyterpene resin having a melting point of 10°C and a viscosity of 100 poises at 50°C | 38.57 |
| low-boiling isoparaffin oil | 26.43 |
| lauryloxypolyethoxyethanol | 9.0 |

The resin in the above mixture is first dissolved in the isoparaffin oil, then the other components are added and the whole sand-milled until substantially all particles are below 5 microns and approximately 50% by weight of the active consists of particles having a diameter of 2 microns or less.

Four liters of the above composition are added to 38 liters of water. This immediately forms an excellent emulsion. The resulting emulsion is sprayed from the air on one hectare of banana plants. The treatment is repeated at intervals of 21 days. Six months after the first application, the sprayed banana plants are healthy. Unsprayed plants, in an area adjacent to the treated plants, are severely damaged by the Sigatoka disease.

EXAMPLE 3

| | Percent |
|---|---|
| 2-benzimidazolecarbamic acid, methyl ester | 10.0 |
| paraffinic spray oil (Sun Superior Spray Oil No. 11E) | 85.0 |
| lecithin | 5.0 |

The above ingredients are combined and sand-ground to produce a composition with a particle size below two microns. The above composition can be sprayed directly from an ultra-low-volume type applicator or diluted with additional paraffinic spray oil and applied in a more conventional low-volume type of application.

A planting of cucumbers is divided into individual plots composed of single rows 10 m long. Alternate rows are left unsprayed all season to serve as buffers and as a source of fungus inoculum. When the plants are beginning to bloom, they are infected with powdery mildew before the first treatment is applied, thus an established infection must be eradicated and uninfected foliage protected if the chemical is to be effective. The above composition is added to water at a rate of 200 ppm of the active compound of this invention in the final aqueous preparation. This preparation is then sprayed on six of the plots randomized through the field. Applications of this preparation are made at 7-day intervals at a rate equal to 800 liters/ha.

During the 10 weeks after the start of the test, the powdery mildew fungus continues to infect, grow and spread through the cucumber planting. At the end of the test, those plots receiving the treatments of the above composition are healthy and support a normal yield of cucumber. The leaves are large and green and completely cover the plot area. Untreated plots and buffer rows are so badly damaged by the disease that most of the leaves have dried up, exposing the meager cucumber crop to damage by sun scald. The yield is a total loss where untreated.

EXAMPLE 4

The following composition is prepared.

| | |
|---|---|
| 2-benzimidazolecarbamic acid, methyl ester | 51.6% |
| sucrose | 44.9% |
| sodium dioctylsulfosuccinate | 3.0% |
| methyl cellulose | 0.5% |

The above ingredients are hammer-milled in a Mikro Pulverizer to a particle size essentially below 100 microns. The hammer-milled product is then air-milled at a steady feed rate, until about half of the active ingredient is in the form of particles having diameters less than 2 microns.

2-Benzimidazole carbamic acid, ethyl ester can be formulated in like manner.

The composition of Example 4 is slurried in water at 300 ppm active along with any of the following emulsifiable oils at 2000 ppm.

"Orchex" 796 and 696
castor oil, peanut oil, olive oil or palm oil containing 10% octylphenoxypolyethoxyethanol-7 E.O.*
corn oil, tung oil and fish oil containing 2.5% each of polyoxyethylene sorbitol hexaoleate and polyoxyethylene sorbitol oleate.
Sunoco Superior Spray oil No. 7E
Sunoco oil No. 7N and 16N containing 1–10% of the following emulsifiers either alone or in combination:
- lauryloxypolyethoxyethanol-7 E.O.
- polyoxyethylene sorbitol hexaoleate
- polyoxyethylene sorbitol oleate
- oleyloxypolyethoxyethanol-2 E.O.
- stearyloxypolyethoxyethanol-10 E.O.
- polyoxyethylene(20)sorbitan monooleate
- polyoxyethylene(30)stearate
- polyethylene glycol 200 monolaurate
- polyhydric alcohol ester ("Trem" 014)
- oil-soluble petroleum sulfonates

*E.O. = ethylene oxide

Selected apple trees in an orchard are sprayed to the point of run-off with the above composition at a concentration of 300 ppm of the active ingredient in water along with 2,000 ppm of one of the listed oils. The first treatment is made when the trees are in the tight cluster stage of development. Additional treatments are made throughout the growing season on an interval of every 18 days. This treatment provides both preventive and curative control.

The above compositions can be compared in a greenhouse test with a wettable powder formulation containing no oil. Selected apple seedling trees are inoculated with *Venturia inaequalis* conidia and incubated in a humidity chamber for 48 hours. This allows infection to become established and disease will continue to develop without additional humidified incubation. The apple trees are removed from incubation, dried and separated into three similar groups. One group is spray-treated until the foliage is wet with the above composition at a concentration of 16 ppm of active ingredient along with Sunoco Superior Spray oil No. 7E at 2000 ppm. Another group of trees is treated similarly with the above composition at 16 ppm active, but with no oil additive. The third group of trees is left untreated.

A treatment must eradicate the established infection to be effective. All plants are allowed to incubate in the greenhouse until the leaves of untreated trees support a heavy scab infection. The two or three leaves on each untreated tree which were susceptible at inoculation time are 80 to 90% covered with sporulating scab lesions. Those trees receiving treatment with the above composition plus oil are essentially free of apple scab and thus are cured of the disease. The susceptible leaves receiving treatment with the above composition but no added oil are badly diseased with about half their surface covered with scab lesions. This demonstrates the outstanding curative action of the above composition when combined with oil. The other oils listed in this example may be substituted for Sunoco Superior Spray oil No. 7E with similar improvement in activity.

EXAMPLE 5

| | |
|---|---|
| 2-benzimidazolecarbamic acid, methyl ester | 20.0% |
| paraffinic spray oil (Sun Superior Oil No. 7N) | 75.0% |
| polyoxyethylene sorbitol hexaoleate | 2.5% |
| polyoxyethylene sorbitol oleate | 2.5% |

The above ingredients are blended and the active component sand-ground to a particle size essentially below 5 microns. The resulting suspension can be emulsified into water.

Two liters of the above composition are added to 38 liters of water. This immediately forms an excellent emulsion. The resulting emulsion is sprayed from the air on one hectare of peanut plants. Treatment is repeated at intervals of 14 days. Four months after the first application, the sprayed peanut plants are healthy. Unsprayed plants, in an adjacent portion of the field, are severely defoliated and the yield is reduced due to cercospora leaf spot disease.

EXAMPLE 6

| | |
|---|---|
| 2-benzimidazolecarbamic acid, methyl ester | 25.0% |
| corn oil | 70.0% |
| polyoxyethylene sorbitol hexaoleate | 2.5% |
| polyoxyethylene sorbitol oleate | 2.5% |

The active component is air-milled to a particle size below 5 microns and is suspended in the oil and blended with the remaining ingredients. The resulting suspension of fine particles can be emulsified into water.

Selected cherry trees in an orchard are sprayed to the point of run-off with the above composition at a concentration of 300 ppm of the active ingredient in water. The first treatment is made when the trees are beginning to bloom. This is after an extended rainfall period which resulted in leaf spot infection. Additional treatments are made throughout the growing season on an interval of every 18 days. At the end of the season, the treated trees are green and healthy having produced a full crop of disease-free fruit. Untreated trees, however, are defoliated due to cherry leaf spot disease and produced a reduced crop due to the brown rot disease.

EXAMPLE 7

| | Percent |
|---|---|
| 2-benzimidazolecarbamic acid, methyl ester | 20 |
| tung oil | 72 |
| polyhydric alcohol esters ("Trem" 014) | 8 |

The active component is air-milled to a particle size below 10 microns and is suspended in the oil and blended with the remaining ingredients. The resulting suspension of fine particles can be emulsified into water.

The above composition is diluted in water so that the active ingredient is at a concentration of 300 ppm. This emulsified suspension is sprayed to the point of run off on selected rose bushes. The treated roses grow normally and produce an abundance of blossoms. Roses growing nearby, but left untreated are so badly unjured by powdery mildew and black spot diseases that they do not produce satisfactory blossoms.

EXAMPLE 8

| | Percent |
|---|---|
| 2-benzimidazolecarbamic acid, methyl ester | 30 |
| pine oil | 65 |
| octylphenoxy polyethoxyethanol ("Triton" X-114) | 5 |

The above components are blended and sand-ground to a particle size below 5 microns. The resulting suspension of fine particles can be emulsified into water.

The above composition is sprayed undiluted on a portion of a rice paddy at the rate of 1 liter/ha. The spray is applied at blossom time and again 10 days later. At harvest the rice heads from the treated area are full and healthy. Much of the untreated rice, on the other hand, is lost because of damage due to the rice blast disease.

I claim:

1. A fungicidal composition useful for the systemic, curative and preventive treatment of fungus diseases in living plants with a wide margin of safety to the plants comprising a fungicidal amount of a compound represented by the formula:

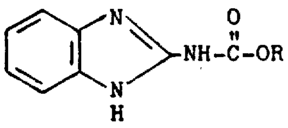

where R is methyl or ethyl, with 10 to 50,000 parts per 100 parts of said compound of a nonphytotoxic spray oil selected from the group consisting of naphthenic spray oils having an unsulfonatable residue of from 75 to 100%, a viscosity in Saybolt seconds at 100°F. of 40 to 220 and a distillation at 10 mm/Hg. 50% point of 300° to 600°F., paraffinic spray oils having an unsulfonatable residue of from 75 to 100%, a viscosity in Saybolt seconds at 100°F. of 40 to 220 and a distillation at 10 mm/Hg. 50% point of from 300° to 600°F., natural triglyceride oils consisting essentially of glycerol esters of at least one fatty acid selected from the group consisting of caproic, caprylic, capric, lauric, myristic, palmitic, stearic, oleic, erucic, linoleic, linolenic, and eleostearic acid, and derived mono and diglycerides which are reaction products of glycerols with at least one fatty acid selected from the group consisting of caproic, caprylic, capric, lauric, myristic, palmitic, stearic, oleic, erucic, linoleic, linolenic and eleostearic acid.

2. The composition of claim 1 wherein the compound of the formula is in the form of particles having a diameter below 5 microns.

3. The composition of claim 1 wherein the compound is 2-benzimidazolecarbamic acid, methyl ester.

4. The composition of claim 2 wherein the compound is 2-benzimidazolecarbamic acid, methyl ester.

5. A method for the systemic, curative and preventive control of fungus diseases of living plants or plant parts with a wide margin of safety to plants, comprising applying to the plants or plant parts a fungicidal amount of a 2-benzimidazolecarbamic acid, alkyl ester of the formula:

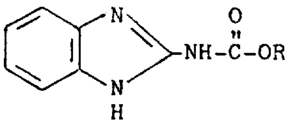

where R is methyl or ethyl, with 10 to 50,000 parts per 100 parts of said compound of a nonphytotoxic spray oil selected from the group consisting of naphthenic spray oils having an unsulfonatable residue of from 75 to 100%, a viscosity in Saybolt seconds at 100°F. of 40 to 220 and a distillation at 10 mm/Hg. 50% point of 300° to 600°F., paraffinic spray oils having an unsulfonatable residue of from 75 to 100%, a viscosity in Saybolt seconds at 100°F. of 40 to 220 and a distillation at 10 mm/Hg. 50% point of from 300° to 600°F., natural triglyceride oils consisting essentially of glycerol esters of at least one fatty acid selected from the group consisting of caproic, caprylic, capric, lauric, myristic, palmitic, stearic, oleic, erucic, linoleic, linolenic, and eleostearic acid, and derived mono and diglycerides which are reaction products of glycerols with at least one fatty acid selected from the group consisting of caproic, caprylic, capric, lauric, myristic, palmitic, stearic, oleic, erucic, linoleic, linolenic and eleostearic acid.

6. The method of claim 5 wherein the compound of the formula applied is in the form of particles having a diameter below 5 microns.

7. The method of claim 5 wherein the compound of the formula applied is 2-benzimidazolecarbamic acid, methyl ester.

8. The method of claim 6 wherein the compound of the formula applied is 2-benzimidazolecarbamic acid, methyl ester.

* * * * *